Jan. 8, 1957  M. A. CHAVANNES  2,776,452
APPARATUS FOR EMBOSSING THERMOPLASTIC FILM
Filed Sept. 3, 1952  4 Sheets-Sheet 4

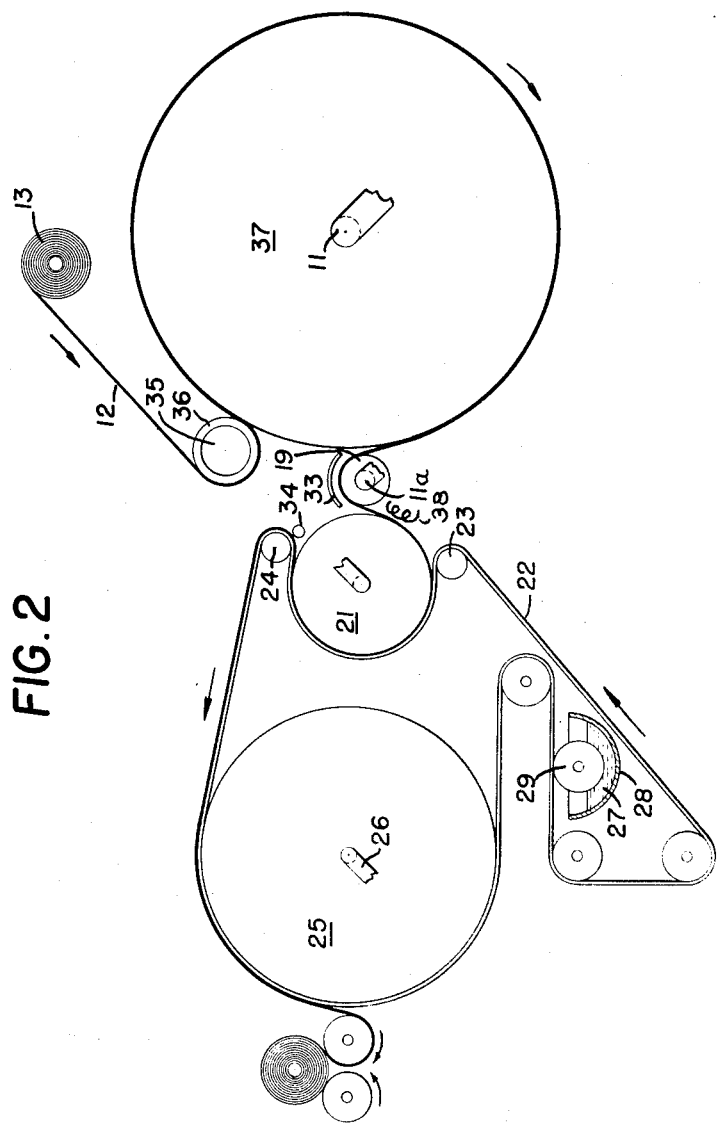

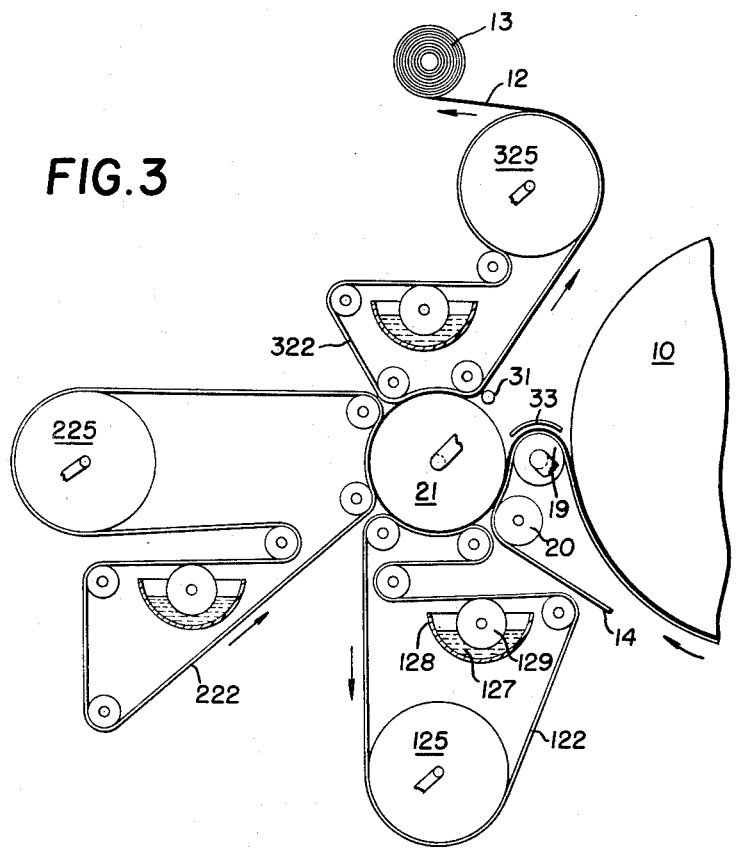
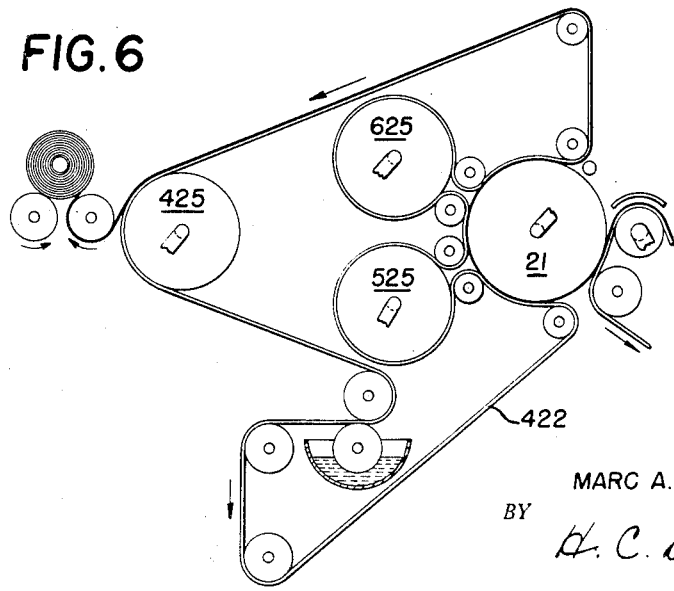

INVENTOR.
MARC A. CHAVANNES
BY
H. C. Dierend
ATTORNEY

United States Patent Office 2,776,452
Patented Jan. 8, 1957

2,776,452

APPARATUS FOR EMBOSSING THERMOPLASTIC FILM

Marc A. Chavannes, New York, N. Y., assignor to Chavannes Industrial Synthetics, Inc., New York, N. Y., a corporation of Delaware Application September 3, 1952, Serial No. 307,671

3 Claims. (Cl. 18—10)

This application is a continuation-in-part of application Serial No. 271,935, filed February 16, 1952, by Marc A. Chavannes. Application Serial No. 271,935 is, in turn, a continuation-in-part of application Serial No. 62,703, filed November 30, 1948, now Patent 2,585,915.

The present invention relates to apparatus for producing embossed thermoplastic film, and the like.

An object of the invention is to emboss thermoplastic film, particularly thin film, or flexible sheet material having at least one thermoplastic face, so as to produce, rapidly and inexpensively, attractive, well-defined, embossed patterns.

In the above-mentioned Patent 2,585,915, the various difficulties of embossing thermoplastic film were explained. There was described therein an embossing method and apparatus featuring, in one embodiment, applying a thermoplastic film to an advancing carrier belt, heating the film while on the carrier belt to a softening temperature, bringing the hot, soft film into contact with a cool embossing roller, holding the film against the embossing roller as it passes around the roller throughout an extended arc, so that the film becomes first embossed and then set while passing through this arc, and thereafter stripping the film from the embossing roller and from the carrier belt.

In the method and apparatus described in the present application, and in that described in application Serial No. 271,935, there are some features in common with the method and apparatus described in Patent 2,585,915, particularly in that the film is preheated and is then passed around a relatively cool embossing roller through an extended arc, being embossed and set while passing around this roller.

In the method and apparatus of the present application, and in that of application Serial No. 271,935, the embossing roller is perforated or porous, and a suction is applied to the interior thereof, for drawing the hot, soft film against and down into the embossing surface of the roller. The embossing surface may, in one form, be the perforated surface of a drum or cylinder which may serve as the roller, but in the preferred embodiments, the embossing surface may be in the nature of a sleeve which is carried by the perforated drum. For example, the drum may carry one or more sleeves, including an outer sleeve of fabric or other material which is porous and which also has surface characteristics adapted to provide a suitable embossing surface. Other examples of embossing members will be described in more detail at a later point.

In one embodiment of an embossing roller to be described herein, the suction is applied throughout the full periphery of the embossing roller. In other variations, the embossing roller may be divided on its interior into two zones, a first one where a suction is applied, and a second one where there is no suction.

In one embodiment of the method and apparatus of the present application, in order to pre-heat the film before bringing it into contact with the embossing surface, there is provided a relatively large heated roller, and the film to be embossed is passed around this roller, being heated to a softening temperature as it passes around the roller. Prior to passing around this heating roller the film may be additionally preheated by passing it through a heated zone. A flexible, heat-resistant carrier belt, which may be of metallic mesh, embraces the heating roller and holds the film against it. At the end of its trip around the heating roller, the film leaves the heating roller and is then advanced and supported by the mesh carrier belt for a short distance. The carrier belt then brings the hot, soft film into engagement with the suction embossing roller and transfers the film to the embossing roller. For this purpose, the carrier belt may embrace the embossing roller through a relatively short arc. After the film is applied to the embossing roller, the carrier belt leaves the film. The film is then held against the embossing roller by the suction in the roller, and the film passes around the embossing roller through an arc of somewhat greater than 180 degrees. The embossing roller is cooler than the softening temperature of the film. The embossing of the film takes place almost as soon as the film is first brought into engagement with the embossing roller, and throughout the rest of the arc through which the film passes around the embossing roller, the film is cooled so as to become set. A feature of the invention is that while the film is passing around the embossing roller it is directly cooled by direct contact with a moving cooling medium. For this purpose it has been found that unique advantages result from bringing a cooling belt into engagement with the film as it passes around the embossing roller. This cooling belt cools the film by direct contact, thereby accelerating the setting of the film so that it will retain its embossed pattern. Although a variety of materials may be used for the cooling belt, certain unique and unexpected advantages result from using certain materials and arrangements. For example, the belt may comprise a heavily napped cloth, such as flannel, having a facing layer of thermoplastic film on the side which engages the embossed film. In order to give the cooling belt its cooling properties, water may be applied to its cloth side, and the belt may also be passed over a chilled roller. The facing layer of thermoplastic film on the cooling belt, being waterproof, tends to prevent the water from the cloth from wetting the embossed film, while at the same time permitting ready transfer of heat from the embossed film to the wet cloth. The cooling belt is sufficiently flexible that it touches the back surface of the film at a great many points, preferably including points where the film is sucked down somewhat into indentations of the embossing surface. This direct cooling action permits greatly increased speed of operation and prevents the embossing roller from being heated to too high a temperature by the pre-heated film. It will be understood that if the embossing roller were allowed to become too hot, the result would probably be that the embossed film would not cool sufficiently during its passage around the embossing roller prior to stripping, and the resulting embossed pattern obtained on the finished film, for a given speed of operation, would be so poorly defined as to be unsatisfactory. With the direct cooling arrangement described herein, however, the embossing roller and the film being embossed are maintained at suitable temperatures, and highly satisfactory embossing results are obtained. The above-described cooling belt arrangement usually makes it unnecessary to provide other means for chilling the embossing roller, but if required in order to keep it cool, a fluid cooling medium may be circulated through it, and an advantageous design to accomplish this without interfering with the suction is described in detail at a later point.

At the conclusion of its passage around the embossing roller, the film is removed from the embossing roller. A feature of one embodiment is the provision of a rotating "control" or "kicker" roller, which aids in the stripping of the film. In stripping the film from the embossing roller, the film and the cooling belt may leave the embossing roller together, and pass over a guide roller. There may, however, at times be a tendency for the film to stick to the embossing roller rather than to leave it and follow the cooling belt around the guide roller. The kicker roller is provided with a relatively rough surface, for example, one of sandpaper, or at any rate, a surface having a high coefficient of friction with respect to the embossed film. The kicker roller is positioned so that if the film tends to drop away from the cooling belt, the film will then engage the kicker roller, which constantly rotates in such a direction as to kick the film back into the desired position on the cooling belt. The speed of rotation of the kicker roller is sufficiently rapid that its surface advances at a more rapid linear speed than does the film.

After leaving the embossing roller with the cooling belt, the film is then stripped from the cooling belt, and wound up on a reel.

In one variation to be described, instead of using a single cooling belt, a plurality, for example, three, may be successively brought into contact with the embossed film as it passes around the embossing roller.

In another variation, a single cooling belt is used, but this belt passes around a plurality of cooling rollers. One or several times during a single trip of the cooling belt along its arcuate path around the embossing roller, the cooling belt leaves the embossing roller, passes around one of the cooling rollers, and returns to the embossing roller.

In another variation, no carrier belt holds the film against the rotating heating roller, but instead the film is pressed against this roller and temporarily bonded to it, being removed from it at the end of the heating zone.

Among the advantages of the present invention are the fact that surprisingly deep and uniform embossed patterns can be produced on even thin film inexpensively, and a particular advantage is that high-speed operation is obtained. Moreover, a wide variety of highly desirable patterns may be produced inexpensively by employing as the active embossing surface of the embossing roller, material, for example fabrics having suitable surface shapes, which can be purchased on the open market and applied to the embossing roller by suitable techniques, including sizing of the fabric. The good qualities of embossing produced, and the practicability of surfacing the embossing roller with materials of the types described herein, flow in part from the use of suction to create the embossing pressure. The high speed operation flows from the combination of the various factors described herein.

As a variation, instead of embossing film alone, one may, by the method and apparatus described herein, emboss knitted fabrics coated with a thermoplastic layer or laminated to a thermoplastic film. One may also, by this method and apparatus, emboss a thermoplastic film laminated to a fabric which includes a major portion of thermoplastic filaments or fibers. In some cases one could likewise emboss a thermoplastic film laminated to a very open fabric of cotton or other natural fibers. Other equivalent materials having thermoplastic faces could be embossed with this method and apparatus.

Further objects, features and advantages will appear from the more detailed description set forth by way of illustration, which will now be given in conjunction with the accompanying drawings, in which:

Fig. 2 is a schematic side elevational view of embossing apparatus differing somewhat from that shown in Fig. 1, particularly in that the film is temporarily lightly bonded to the heating roller, being in this manner held against the heating roller, and, unlike Fig. 1, no carrier belt embraces the heating roller outside the film.

Fig. 3 is a schematic side elevational view showing a portion of another type of embossing apparatus, particularly illustrating the use of a plurality of cooling belts.

Fig. 6 is a schematic side elevational view showing a portion of another type of embossing apparatus, illustrating the use of a single cooling belt in combination with several cooling rollers.

Figure 1:
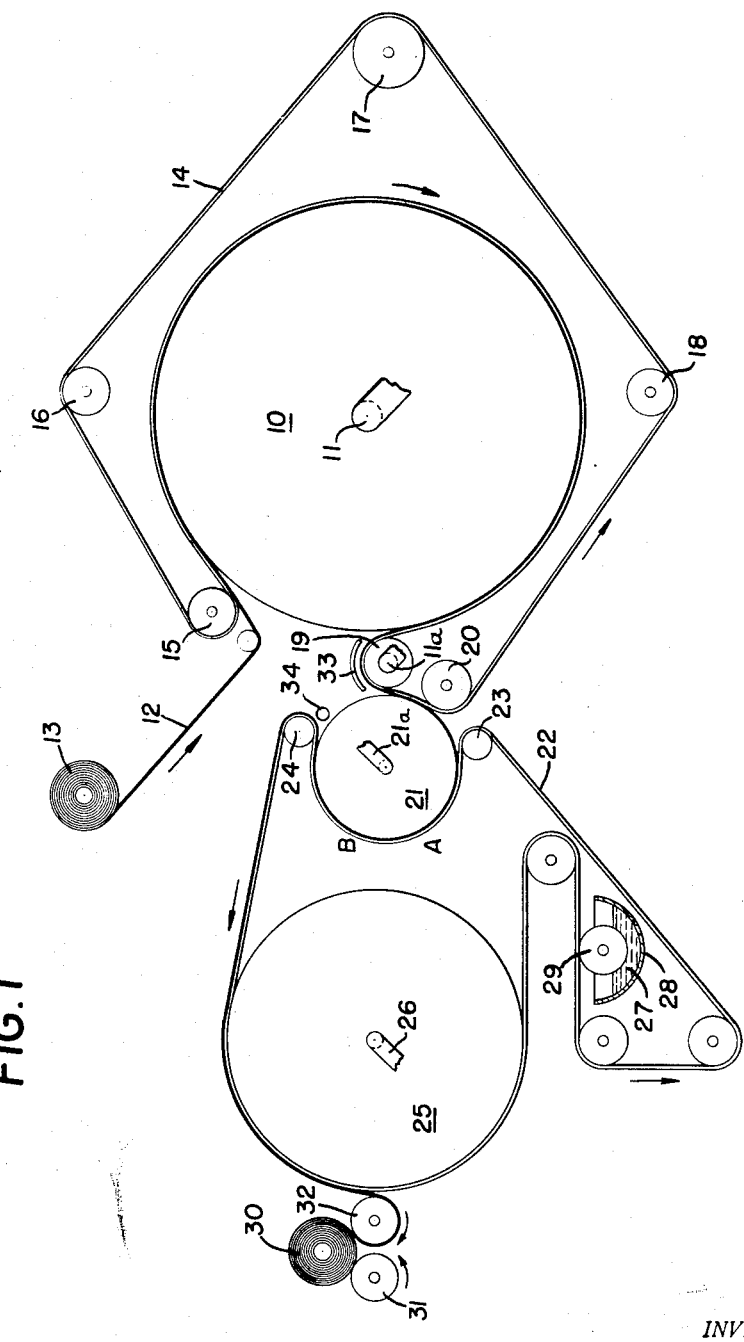
Fig. 1 is a schematic side elevational view of embossing apparatus.

There is provided in the embodiment of Fig. 1, a large heating roller 10, which may be constructed in the form of a metal drum. A hot fluid, such as oil, may be circulated through the drum through a pipe arrangement schematically indicated as 11. A thermoplastic film 12, for example, of a vinyl type, is drawn from a reel 13 and passed around the hot roller 11, being held against this roller by a belt 14, which should be of flexible heat resistant material, for example, metallic mesh. As will be understood from the subsequent description, this belt serves, at a later point, to support the hot soft film, and for this reason this belt will be referred to herein as a carrier belt. The carrier belt 14 is guided along its path by guide rollers 15, 16, 17, 18, 19 and 20, and is also guided by the heating roller 10. As an example, the temperature of the heating roller may be of the order of 300-365° F. It will be understood that depending upon the particular film to be embossed, the temperature of the heating roller will differ. The film should, prior to reaching the embossing roller, be raised to a high enough temperature so that it may be readily embossed. For example, it may be hot enough and therefore soft enough so that it may be embossed with a pressure of about one-half pound per square inch. On the other hand, it should not be so hot that holes will be produced in the film when it is passed around a porous suction embossing roller of the type described herein. The film may, as a variation, be preheated before it is passed around the heating roller, by suitable means.

After leaving the heating roller 10, the carrier belt and the hot soft film pass over the guide roller 19. This guide roller is heated by circulation of a hot fluid through it, via a pipe 11a. This pipe may be connected in series with the pipe 11 which circulates hot fluid through the heating roller 10. The path of the carrier belt 14 in the region of the embossing roller 21 is determined by the relative positions of the guide rollers 19 and 20, and the embossing roller 21. As may be seen in Fig. 1, the carrier belt 14 embraces the embossing roller 21 through a relatively short arc, and then passes around the guide roller 20, thereafter returning to the guide roller 18.

Since the film is carried into engagement with the embossing roller 21 in the region between the guide rollers 19 and 20, and since the embossing roller has a porous surface and has a suction applied to its interior via a pipe 21a, the hot, soft film is transferred from the carrier belt 14 to the embossing roller 21. The film is then carried around the embossing roller 21 through an arc of greater than 180°. Because the film is hot and soft when it first comes into contact with the embossing roller, very little pressure is needed to emboss its surface. The necessary pressure of the film against the embossing roller is supplied by the pressure difference at the two surfaces of the film, caused by the suction or sub-atmospheric pressure within the embossing roller. A feature of the method and apparatus is that, after the hot, soft film is embossed, it is maintained in contact with the embossing roller throughout an extended arc, and while advancing through this arc, it is directly cooled sufficiently to set the film so that it will retain its embossed pattern. The embossing roller 21, with the film on it, is embraced by a cooling belt 22, which aids materially in rapidly cooling the embossed film. The cooling belt 22 is carried by guide rollers 23 and 24, and a larger guide roller 25, which is cooled, as by the circulation of a cooling fluid such as tap water through it via a pipe 26.

The cooling belt should be quite flexible, so that it will have a great many points of contact with the embossed film, and it should preferably tend to conform somewhat with the shape of the back surface of the film, which will include indentations corresponding to indentations in the embossing roller. It also should be adapted to remove heat rapidly from the film. In one construction, the cooling belt may comprise a heavily napped cloth, such as flannel, having a 2-mil-thick layer of vinyl film on its side which contacts the film being embossed. A cooling fluid, for example, tap water, 27 held in a container 28, is applied by a roller 29 to the cloth surface of the cooling belt, as is schematically shown in Fig. 1. It will be noted that this wetting of the reverse side of the cooling belt takes place at a station after this belt has been cooled by the cool guide roller 25. The thermoplastic film on the front face of the cooling belt effectively prevents the water from its cloth face from wetting the film being embossed, but it is thin enough to allow ready transfer of heat from the embossed film to the wet cloth layer.

Also, it has been found that when a vinyl-faced cooling belt of the type described is used in connection with the embossing of vinyl film, stripping of the embossed film along with the cooling belt from the embossing roller is facilitated.

While fabric cooling belts having waterproof thermoplastic films on their front faces provide the aforementioned unique advantages, in other variations of the method and apparatus fabric cooling belts without such films on their faces may be satisfactorily and advantageously employed in the apparatus herein described.

In the arrangement shown in Fig. 1, the embossed film and the cooling belt 22 are removed together from the embossing roller 21 and thereafter the film is then stripped from the cooling belt and wound up on a reel 30. The reel 30 may, in turn be carried and rotated by the rollers 31 and 32.

Shield or reflector means are provided for preventing the embossed film from being reheated after it leaves the embossing roller. For example, the shield and reflector 33 may separate the embossed film from the region of the hot roller 19, and also possibly from the region of the hot roller 10.

In some cases, because of the adhesion of the film to the embossing surface, which may be caused in part by the undulations in the embossing surface, including a few slightly undercut regions, the embossed film tends to stick to the embossing roller, instead of following the cooling belt 22 around the guide roller 24. In order to aid in the stripping operation, there is provided a relatively small kicker or control roller 34, which because of its position, the nature of its surface, and the manner of its rotation, engages the film when the film drops away from the cooling belt 22 and the guide roller 24, and the kicker roller 34 kicks the film back into the desired position on the belt 22, from which it may be readily stripped. This action by the kicker roller 34 prevents the film from continuing on around the embossing roller 21. The kicker roller should have a surface which grips the film, for example, one of sandpaper or the like. Also, it should rotate at a speed high enough so that its surface next to the film advances forwardly at a speed faster than that of the film, preferably several times as fast.

Attention is now directed to the region where the hot film 12 first contacts the cool embossing roller 21.

Under certain conditions, for example, when the pattern of the embossing surface of the embossing roller is deep, the problem may arise that the high points of the cool embossing roller will tend to cool and harden or set the film so quickly that the film would not sufficiently conform to the surface pattern of the embossing roller to produce the desired embossed effect on the film, if provision were not made to overcome this problem. For this purpose, heat may be applied to the film in the region where it first contacts the embossing roller to maintain it at an embossing temperature until it is embossed. The heat may be applied at this point by the action of a radiant heater, or by blowing hot air, against the back of the carrier belt opposite where the film first engages the embossing roller. Alternatively, a very short oven may embrace the film and carrier belt at this point.

Reference is made to Fig. 2, which shows a different form of the embossing apparatus. The chief difference between the apparatus of Fig. 2 and that of Fig. 1 is that in Fig. 2 no carrier belt is used to hold the film against the heating roller, as the belt 14 does in Fig. 1. Instead, in Fig. 2 a special arrangement is provided for temporarily bonding the film to the heating roller, as will be described below. It will be understood that elements in Fig. 2 designated by the same reference numerals as those in Fig. 1 are constructed in the same manner as has been described in detail heretofore in connection with Fig. 1.

In Fig. 2 the film 12 is drawn from the reel 13 and then passed around a roller 35, being pressed by this roller onto the heating roller or drum 37. The purpose of the roller 35 is to "iron" the film onto the heating roller 37, thereby temporarily bonding the film to this roller. The roller 35 is provided on its surface with a layer 36 of rubber or other resilient material. In some cases the roller 35 may be chilled, as by running tap water through it, in order to prevent it from becoming too hot as a result of its closeness to the heating roller 10, thereby preventing the film from adhering to the roller 35. The heating roller 37 of Fig. 2 is like the heating roller 10 of Fig. 1, except that the roller 37 should be coated with a resin to prevent the film from sticking too tightly. The melting point, or excessive softening point, of this resin should be higher than the temperature of the drum. Also this coating must not deteriorate at the temperature of the drum. Suitable resins are nylon, silicones, and resins of the polytetrafluoroethylene type. A suitable example of a resin of the last-mentioned type is that sold under the trade mark Teflon by E. I. Du Pont deNemours & Co., Inc. A similar resin coating may also be used on the roller 10 in the arrangement of Fig. 1.

It has been found that thermoplastic film, for example, of the vinyl type, when ironed in this manner on to a hot roller such as 37 will temporarily adhere to the surface of this roller. The roller 37 should be maintained at a temperature at which the adjacent surface of the thermoplastic film tends to soften.

After passing around the roller 37 the film 12 leaves this roller, passes over the smaller heated guide roller 19 and thence onto the suction embossing roller 21. A heater 38 opposite the point where the film first contacts the embossing roller, maintains the film at an embossing temperature until it is embossed, thereby preventing premature cooling. It will be observed that in Fig. 2 the film is transferred from the heating roller 37 to the embossing roller 21 without the aid of a carrier belt such as the belt 14 of Fig. 1.

The suction embossing roller 21, the cooling belt 22, the arrangements for cooling and wetting this belt, the kicker roller 34, and the stripping arrangements in Fig. 2 are the same as in Fig. 1.

In another variation of the apparatus, the film may be "ironed" onto the heating roller, as described in connection with Fig. 2, but a carrier belt such as 14 of Fig. 1 may also be employed to transfer the film from the heating roller to the embossing roller, as in Fig. 1.

Reference is now made to Fig. 3 which show a variation of the apparatus employing a plurality of cooling belts, three such belts being shown in this figure. In order to explain the usefulness of a plurality of cooling belts, it may be explained that, to a large extent, the speed of operation of the apparatus depends upon how rapidly the embossed film may be cooled. In the arrangements shown in Figs. 1 and 2, a given area of the embossed film, in passing around the embossing roller 21, is maintained in contact with the same area of the cooling belt 22. In Fig. 3 on the other hand, the embossed film is first engaged by a first cooling belt, and during subsequent arcuate portions of its path around the embossing roller it is engaged by different cooling belts, the object being that by employing a plurality of cooling belts operating upon the embossed film in successive portions of its path around the embossing roller, the entire embossing operation may be run at higher speed while still obtaining sufficient cooling of the film so that it will retain its embossed pattern after it is removed from the embossing roller.

In the arrangements shown in Fig. 3, the film 12 may be assumed to be heated and softened on the heating roller 10 by an arrangement like that shown in more detail in Fig. 1, being held against the roller 10 by the carrier belt 14 and then passed over the heating guide roller 19 and transferred from the carrier belt 14 to the embossing roller 21. The operation up to this point is exactly like that described in connection with Fig. 1. During its passage around the embossing roller 21, the film is first engaged and cooled by a cooling belt 122 similar to the belt 22 of Fig. 1. The belt 122 then disengages the film and another cooling belt 222 engages it. As shown, at a subsequent point, the cooling belt 222 disengages the film and cooling belt 322 engages it. The arrangements for cooling and wetting the cooling belts in Fig. 3 are similar to those in Fig. 1. It will be observed that in each case illustrated in Fig. 3, the water is applied to the side of the cooling belt which does not engage the embossed film. It will be understood that elements in Fig. 3 designated by the same reference numerals as those in Fig. 1 are constructed in like manner. The cooling belts and their associated parts in Fig. 3 are similar to the corresponding elements in Fig. 1. In Fig. 3 the cooling belt assemblies are designated by the same reference numerals as in Fig. 1, except that in Fig. 3, the reference numerals are increased by 100, 200 or 300, for the various cooling belt assemblies, as will readily be understood from inspection of the drawings.

Another variation will now be described as a modification of the apparatus which has already been described. In Fig. 1, there is a single cooling belt 22, a single cooling roller 25, and a single station where water is applied to the cooling belt by a roller 29. In the variation now being described, there is a single cooling belt and a single station at which water is applied to the belt, but there are several cooling rollers. Thus after the cooling belt has passed around the embossing roller through an arc which represents a fraction of its total arcuate path around the embossing roller, it may temporarily leave the embossing roller (for example in the region of the station A in Fig. 1), pass over another cooling roller, and return to the embossing roller in the same region where it left. After returning to the embossing roller the cooling belt continues its passage around it, and may, after advancing through another arc, again leave the embossing roller, as at station B, pass over another cooling roller, thereafter returning to the roller 21 at station B and continuing on around the embossing roller. Fig. 6 shows such an arrangement, in which a single cooling belt 422 cooperates with cooling rollers 425, 525 and 625, and embossing roller 21. In explaining the advantages of such an arrangement, it may be pointed out that the effectiveness of the cooling belt in facilitating high speed operation is limited by the rate at which it can remove heat from the film. The addition of water to the cooling belt increases its heat capacity, but even though the heat capacity of the wet belt may be very high, a limiting factor in the operation of apparatus of the type shown in Figs. 1 and 2 is the rate at which heat may be conducted through the water in the belt toward its rear surface. In the arrangement shown in Fig. 6, the limitation based upon the rate of heat conduction from one particle of the wet belt to the next is, to a certain extent, removed. After the front or film-engaging face of the cooling belt is warmed somewhat by the film, it leaves the film, is directly chilled by a cooling roller such as 525, and then returns to the film. A given area of the outer surface of the film, in passing around the embossing roller, contacts more than one area of the cooling belt. It has been found that the last cooling roller in the series (for example, 625 in Fig. 6) may advantageously be colder than the other cooling rollers need be, and for this purpose it may be refrigerated as by passing cold brine through it, while the other cooling rollers may be cooled merely with tap water. Such an arrangement has been found to be very effective and yet economical.

CONSTRUCTION OF EMBOSSING ROLLER

Various constructions of the embossing roller 21 may be employed. It will be understood that any of these various constructions of the embossing roller to be described may be employed with any of the configurations of the entire apparatus described herein, including the apparatus illustrated in Figs. 1, 2, 3 and 6.

First embodiment of embossing roller

In one arrangement, the embossing roller comprises a perforated metal drum surrounded by a layer of metallic mesh, which in turn is surrounded by a perforated sleeve of sheet metal carrying on its outer surface a layer of sized fabric, the ends of the fabric being butted together and bonded in place to the sheet metal sleeve. The surface of the layer of fabric has hills and valleys which provide the desired design. For example, the fabric may be of lace or of a variety of other types. The air is sucked from the interior of the drum through a pipe connected to the end of the drum at its axis. This suction is applied to the entire 360 degree periphery of the drum. This arrangement is in many respects the preferred one, having many advantages, including excellent performance and simplicity of construction.

As will be understood from the previous description of the present invention, the temperature of the various portions of the apparatus is of great significance in assuring its succesful operation. Since the film is hot at the time it reaches the embossing roller, the film tends to heat the embossing roller. If the apparatus were not so designed as to prevent the embossing roller from becoming overheated, high speed operation could not be obtained because the film would not have cooled sufficiently during its passage around the embossing roller to retain its embossed pattern. In the embossing roller arrangement now being described, the temperature of the embossing roller is maintained at a sufficiently low temperature by two factors—first and most importantly, the cooling belt continually removes heat from the embossed film, thereby tending to prevent this heat from passing into the embossing roller, and secondly, the suction throughout the full 360 degrees of the periphery of the embossing roller, including the region where this roller is exposed because not engaged in this region by the film, tends to draw a certain amount of air at room temperature through the surface of the embossing roller in the region referred to above. This movement of air into and through the roller provides some additional cooling.

Second embodiment of embossing roller

A second embodiment of the embossing roller is generally like the first but differs in that the interior of the embossing roller is divided by transverse walls into chambers so that the suction is applied only throughout approximately that portion of the embossing roller where the film engages it. The details of such an embossing roller are described in application Serial No. 271,935 in connection with Fig. 2 of that application. Since there is within such an embossing roller a chamber which is isolated from the suction chamber, a jet of cool air may be applied to the interior of the suction roller in this isolated region, as is described in application Serial No. 271,935.

For additional cooling, in any of the embodiments of the embossing rollers described herein, a jet of air may be applied to the exterior of the embossing roller, in the region where the film does not engage it.

Third embodiment of embossing roller

Figure 4:
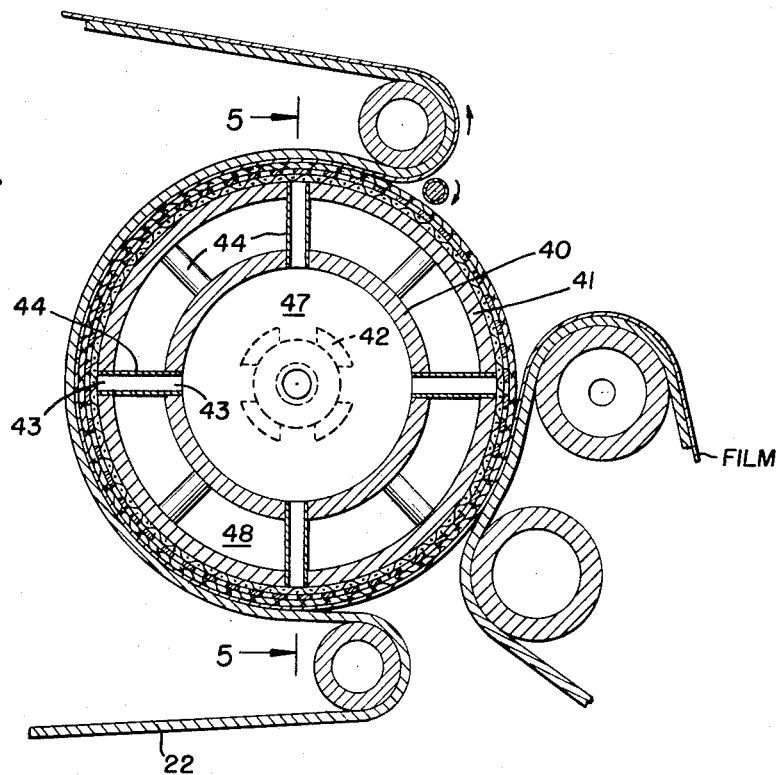
Fig. 4 is a cross sectional view through one type of embossing roller which may be used in case fluid cooling of the interior of the embossing roller is used.
Figure 5:
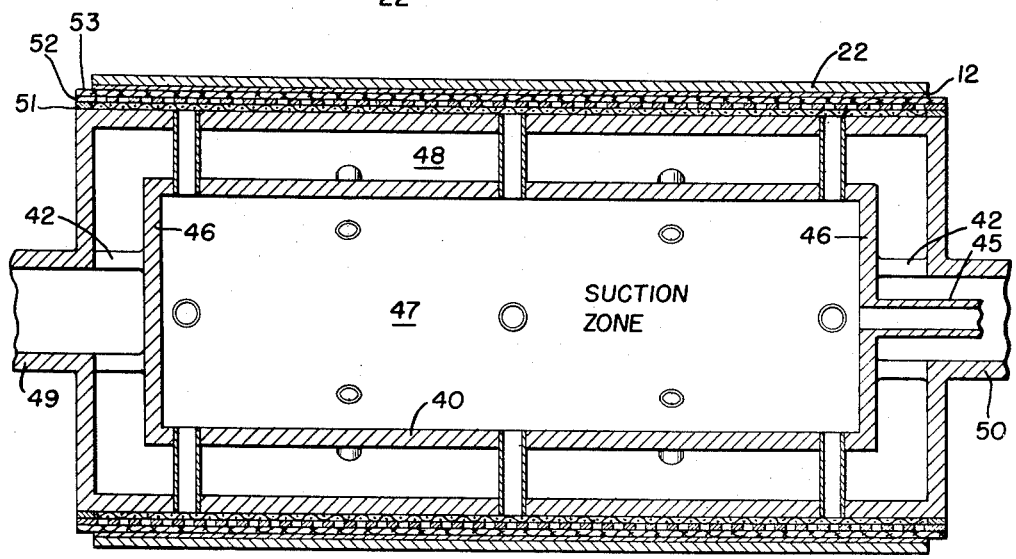
Fig. 5 is a longitudinal sectional view of the roller shown in Fig. 4, the position of the sectional plane being shown at 5—5 in Fig. 4.

The third embodiment of the embossing roller is illustrated in Figs. 4 and 5 of the present application. This embodiment is more complicated in construction, but has the advantage of providing liquid cooling of the interior of the embossing roller through its entire periphery. The embossing roller illustrated comprises a double-walled drum, the inner wall being formed by a cylinder 40 and the outer wall being formed by a cylinder 41. The cylinders are supported with respect to one another by web-like supports 42 at either end. The cylinders 40 and 41 include aligned orifices 43, which are connected by conduits or tubes 44. The suction is applied to the interior of the inner cylinder 40 through a pipe 45 connected to one end of this cylinder, and since the cylinder 40 is otherwise closed by its end surfaces 46, it may be seen that air is drawn into the inner cylinder only through the tubes 44 which extend to the exterior of the outer cylinder 41. It may therefore be seen that the suction zone 47 within the inner cylinder 40 is isolated from the zone 48 between the inner and outer cylinders. Cooling fluid such as tap water is circulated in this zone 48, being introduced through a pipe 49 at one end and removed through a pipe 50 at the other end. The resulting cooling effect serves the purpose of preventing the embossing roller from becoming overheated.

It will be observed that the orifices 43 are spaced rather widely apart. Just outside the outer cylinder 41 is a layer 51 of metallic mesh. This layer is in turn surrounded by a sleeve 52 of perforated sheet metal, the perforations being more closely spaced in this sleeve than the orifices in the cylinders 40 and 41. Snugly carried on and bonded to the sleeve 52 is surface layer 53 of sized fabric, or the like, which provides the effective embossing surface having a surface pattern in the shape of the desired design. The film 12 and the cooling belt 22 may be seen next, in order, outside the fabric layer in Figs. 4 and 5. When it is desired to change the pattern, the perforated sheet metal sleeve 52 along with its fabric surface layer 53 may be removed. A new sleeve having a fabric surface layer defining a different design may then be placed on the embossing roller.

For sizing the fabric surface layers of all of the embodiments of the embossing rollers, a thermosetting heat resistant resin should be used.

Illustrative films which may be suitably embossed by the principles of the present invention are films of vinyl, nylon (polyamide), cellulose acetate, rubber hydrochloride, polyethylene, and Saran (polyvinylidene chloride).

While the cooling belt arrangements described herein, in combination with other components of the apparatus, produce unique, unexpected, and important, advantages, it is to be understood that this invention, in its broadest sense, is not necessarily limited to combinations including such cooling belts. For example, instead of using cooling belts, one may modify the apparatus by applying some other cool medium to the embossed film while it is still in contact with the embossing surface; thus jets of cool air or water may be directed against the outer surface of the film during its passage around the embossing roller. While such modified apparatus may have some of the important advantages of the invention which result from the use of novel subcombinations of the apparatus and method, it will be understood that such modified apparatus will not have those particular advantages associated with the use of cooling belts in combination with the other elements of the apparatus.

It will also be understood that various features described in the present application in connection with one of the general configurations of apparatus may be used in other configuration of the apparatus described. For example, the cooling belt arrangements of Figs. 3 and 6 may be used in apparatus having the film-heating arrangements of either Fig. 1 or Fig. 6, that is, either with or without a carrier belt.

Other variations of the present invention comprise the combination of the features, elements, and steps described herein with the method and apparatus of prior application Serial No. 271,935. For example, any of the cooling belts or embossing rollers described herein may be employed with any of the general configurations of apparatus shown in Figs. 1, 3 and 4 of application Serial No. 271,935. Likewise, embossing rollers of the types illustrated and described in application Serial No. 271,935, and other features of that application, may be used in the general configurations of apparatus, and in the method, of the present application. In general, the disclosure of application Serial No. 271,935 is incorporated herein by reference.

While a suitable form of apparatus and method in accordance with the invention have been described in some detail, and certain modifications have been suggested, it will be understood that numerous changes may be made without departing from the general principles and the scope of the invention.

I claim:

1. In apparatus for embossing thermoplastic film, in combination, a porous embossing roller, means for advancing said film along a path and around said roller over an arcuate portion thereof, heating means for heating said film to a softening temperature prior to the point where it first engages said roller, said embossing roller comprising a cylindrical porous sleeve member, supporting means for supporting said sleeve member and forming with said sleeve member a generally cylindrical chamber, and means for sucking air from within said chamber, said sleeve member comprising a perforated metallic sleeve having a fabric sleeve bonded to its outer surface, said fabric sleeve bearing a desired design, whereby the suction within said chamber acting through said sleeve member draws said hot soft film against said fabric sleeve in the region of said arcuate portion and thereby embosses said film with said design, said sleeve member being readily removable from said supporting means whereby it may be readily replaced by another sleeve member including a fabric sleeve bearing a different desired design.

2. Apparatus as in claim 1, including means for applying a cooling liquid to said film as it passes around said roller.

3. In apparatus for embossing thermoplastic film and the like, in combination, an embossing roller having a porous embossing surface of fabric carrying a design to be embossed in said film, means for passing a preheated thermoplastic film around said roller through an extended arc of substantial length, means for sucking air from within said roller to hold said film against said roller by suction throughout said arc, said fabric being of character tending to insulate said film from the inner portions of said embossing roller and thereby interfering with adequate cooling of said film by said roller, a cooling belt comprising water-absorbent material, means for bringing said cooling belt into contact with said film in at least a portion of said arc while said film is on said roller, means for applying water to said absorbent material of said cooling belt to cool the same at a point in advance of the point where said cooling belt engages said film, for cooling said film without applying excessive water to said film, and means for thereafter stripping said film from said roller and from said cooling belt.

References Cited in the file of this patent

UNITED STATES PATENTS

| | | |
|---|---|---|
| 2,152,101 | Scherer | Mar. 28, 1939 |
| 2,354,916 | Hurt | Aug. 1, 1944 |
| 2,493,439 | Braund | Jan. 3, 1950 |
| 2,526,318 | Battin | Oct. 17, 1950 |
| 2,567,275 | Colombo | Sept. 11, 1951 |
| 2,576,317 | Toulmin | Nov. 27, 1951 |
| 2,585,915 | Chavannes | Feb. 19, 1952 |
| 2,660,757 | Smith et al. | Dec. 1, 1953 |